United States Patent [19]

Schichl

[11] Patent Number: 4,893,749
[45] Date of Patent: Jan. 16, 1990

[54] MIXER VALVE FOR HEATING INSTALLATIONS

[76] Inventor: Karl Schichl, Warngau, Fed. Rep. of Germany

[21] Appl. No.: 169,745

[22] Filed: Mar. 17, 1988

[51] Int. Cl.$^4$ .......................... F16K 19/00; F24H 9/20
[52] U.S. Cl. ..................... 237/8 C; 137/564; 137/565; 137/563
[58] Field of Search .................. 237/8 R, 8 C, 56, 19; 137/563, 564, 597, 565, 565.2, 569

[56] References Cited

FOREIGN PATENT DOCUMENTS 1958277 2/1971 Fed. Rep. of Germany.
7716337 6/1985 Fed. Rep. of Germany.
2385020 10/1978 France.

*Primary Examiner*—Henry A. Bennet
*Attorney, Agent, or Firm*—Steele, Gould & Fried

[57] ABSTRACT

The invention refers to a mixer valve, particularly for heating and hot water installations, which is integrated into the housing of a circulation pump in such a manner that the wheel-shaped actuator, which is provided with blades, and the running wheel of the circulation pump are arranged with flush axles, so that the mixer actuator can be adjusted by means of coupling links which can be inserted or removed in relation to the running wheel of the circulation pump via a controllable coupling. According to the invention, the actuator is designed in such a manner that, independently of the position of the actuator and/or its blade, a water exchange in the order of magnitude of 10% of the water throughput will take place even in the blocked position, so that the water returning from the heating circuit is mixed and thus warmed prior to returning into the boiler.

7 Claims, 1 Drawing Sheet

MIXER VALVE FOR HEATING INSTALLATIONS

BACKGROUND OF THE INVENTION

The invention refers to a mixer valve of the type required particularly for heating and hot water installations, integrated into the housing of a circulation pump in such a manner that a wheel-shaped mixer actuator, which is provided with blades, and a running wheel of the circulation pump are arranged to be coupled for positioning the mixer/actuation. The mixer/actuation and the running wheel, for example, have flush axles and the mixer actuator and the running wheel drive of the circulation pump can be axially engaged by means of a controllable coupling by which they contact one another. Alternatively, a coupling can be inserted and retracted.

According to such a construction, a mixer valve can be built in a particularly space-saving manner in conjunction with a circulation pump, since the compact design allows direct control of the warm and cold water to be circulated. In addition, a common drive for the actuator of the mixer valve and for the circulation pump also facilitates the control processes, allowing correct control of the outflow and return flow of the heating water, since both devices form one unit.

Accordingly, the present invention concerns a further development of such a combination of mixer valve and circulation pump, of which the basic structure has previously been disclosed by the present inventor, as shown in DE-PS No. 19 58 277, dated Oct. 7, 1971.

The invention is based on an insight gained by the inventor, that it is extremely damaging for heating installations, if returning heating water is at a temperature below a given minimum temperature, preferably in the 40°–45° C. range. In the case of too low a temperature, thermal stresses occur in an operating heating installation, and will cause deterioration.

An object of the invention is to provide a mixer valve which, in combination with a circulation pump, is built in such a manner that in any position of the actuator, independently of external influences and particularly also in case of a power failure, a return temperature lower than the specified minimum temperature of the return water is reliably prevented. This is accomplished independently of operational conditions, including for instance, if several cooled heating elements in a heating system are suddenly started up, when the heating is just started and also when the heating has already been running for some considerable time.

This object is achieved according to the invention by means of a mixer valve with a certain permanent uncontrollable bypass for a portion of the water moving through the mixer/actuator.

In the mixer valve according to the invention, the actuator of the valve proper is designed in such a manner that even in a position where a path through the actuator is nominally blocked in any direction, namely independent of the position of the actuator or its blades, there is still a water path. The bypass volume can be small compared to the total through-flow, namely in the order of magnitude of 10% of the water through-put, so that the (cool) water returning from the heating circuit to the valve is mixed with (hot) water coming from the boiler and is thus brought up to the desired higher return temperature before returning into the boiler.

Mechanically, there are several ways of achieving this mixing, which is to be provided according to the invention, namely of the heating water coming from the boiler with the cooled return water coming from the heating circuit. For example, one could envision providing the mixer valve with a "bypass" passage which renders possible a return of heating water into the return circuit.

Thereby, mixer valve, distributor, and pump are built in a particularly compact manner, so that the unit can be installed even in basements with low ceilings.

However, it is particularly advantageous if mixing is accomplished by keeping the width of the mixer actuator blades less than the clearance width therefor in the interior of the mixer. As a result, independent of the position of the mixer actuator, there can always be, between blade and wall, a passage of water. The passing water then self-adjusts to buffer the temperature drop between one mixer chamber and the other.

According to a further development of the invention, an idle position is preferably assigned to the mixer valve. In the idle position there is, on one hand, a direct connection between the boiler outflow and the heating water output and, on the other hand, between the heating water return and the boiler return. The idle position is always assumed when, for any reason, the circulation pump becomes inoperative, e.g., in case of a power failure. Contrary to all other installations including circulation pumps, this installation guarantees that circulation around the whole heating loop will constantly be driven and provided with hot water. This results from gravity and the temperature differences of water in the loop. The advantage of the mixing process between hot water and return water is retained without change.

Since the idle position must be set in case of a power failure, it must be manually adjustable. For this reason, an additional further development provides a particularly simple coupling between a manual drive and the drive shaft of the mixer actuator by means of an activating shaft. The coupling between the drive shaft of the mixer/actuator and the activating shaft consists of a shaft guided in a coupling part and rotatable from the outside, defining a half-shaft in the coupling area. This establishes a rigid connection between the two parts to be coupled, namely connection by nonrotatable engagement of complementary shapes, or a disconnection, whereby the disconnected part can slide freely over the flat portion of the half-shaft.

BRIEF DESCRIPTION OF THE DRAWINGS

Additional characteristics will be explained in the following with reference to the enclosed drawings.

The following is shown in the drawings.

DETAILED DESCRIPTION OF THE PREFERRED EMBODIMENTS

Figure 1:
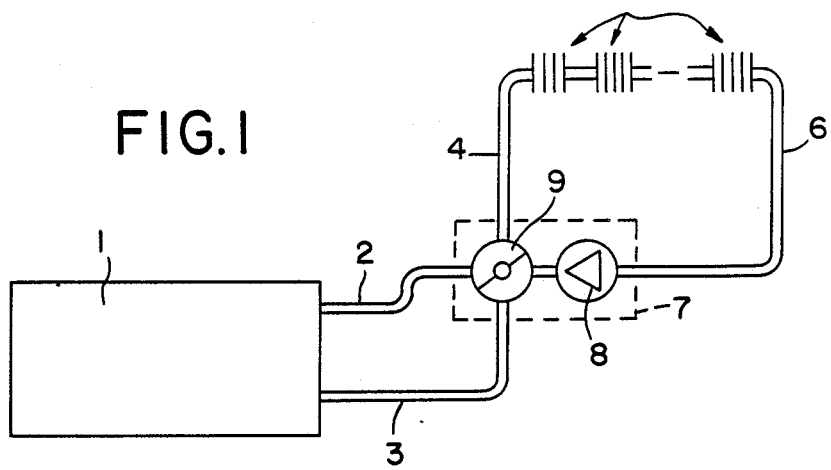
FIG. 1 is a schematic illustration of a heating circuit.

In FIG. 1, numeral 1 schematically identifies a boiler, from which heated water is led via a line 2 to a mixer valve 9, and to which the return water is led back via a boiler return line 3. The heating output from valve 9 flows via a heater line 4, by means of which individual radiators are provided with hot water. The hot water is then transported via a heating return line 6 to a unit 7 having a pump 8 and mixer valve 9. Contrary to traditional installations, the circulation pump 8 is placed in the return flow, which is of particular importance in case of a power failure, as will be explained in detail.

The circulation pump 8 and the actuator of the mixer valve 9 are built together with flush axles, so that the drive of the circulation pump 8 can be directly used to move the actuator of the mixer valve 9. The pump and the actuator parts can be controllably coupled and then released from each other, for example mechanically, hydraulically, magnetically, or in other ways.

The actuator of the mixer valve 9 is shown in FIG. 1 in that position to which it is set during normal heating operation, in which the heating water is nominally directed from the boiler output 2 into the heating circuit outflow 4, and the returning water flows from the heating circuit return 6 into the boiler return 3. These flows occur at a speed which is always related to the function of the pump 8.

Figure 2:
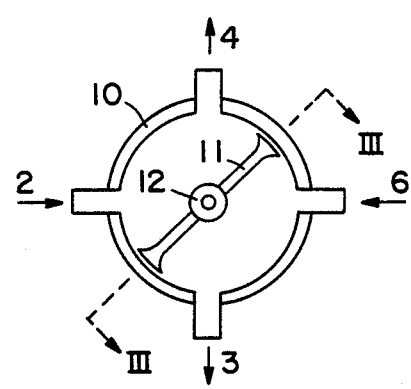
FIG. 2 is a section of a top view of an actuator for a mixer valve according to the invention; and, FIG. 3 shows the actuator, in a section along the line III—III in FIG. 2.

This position of the actuator is illustrated in FIG. 2 in a slightly more objective representation and on a somewhat larger scale. In FIG. 2, the four line connections are identified with the same reference numerals as in FIG. 1. The actuator proper divides the interior space of the valve into two halves by means of the blades 11. The blades can be adjusted to the required setting in a manner known per se, namely via a drive shaft 12. Depending on the drive of the circulation pump 8, the shaft 12 is rotated in a manner known per se, for example by means of a hydromechanical or electromagnetic or mechanical coupling. The can be accomplished based on control values sensed in the heating circuit or from the heated rooms, whereby the heating return flow can be directly connected with heating outflow if appropriate, etc.

Without application of the invention, the heating water coming from the heating return 6, possibly very much cooler than the boiler, would go directly into the boiler return flow 3 when the actuator position is as shown in FIG. 2. In such a case, especially if the boiler runs at high temperature levels, e.g. 80° C. or higher, thermal stresses occur in the boiler proper. Stresses occur not only in the immediate intake area but also in the walls of the boiler, in the heating pipes, etc., where the significantly colder water is flowing.

Figure 3:
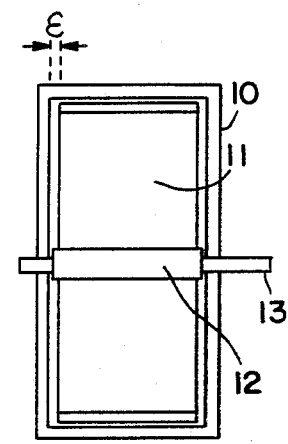

According to the invention, as shown in principle and not to scale in FIG. 3, a permanent residual connection is provided such that flow passes between the space for outflow of heating water and the space for the return flow of water. The residual connection is due to the fact that the width of the blades 11 is less than the clearance therefor between the walls of the housing 10 of the mixer valve. This creates an open slot e, through which the hot water from the outflow circuit can enter the return flow. The hot water passing through slot e correspondingly preheats this return flow water and brings it to a temperature in the range between 40° C. and 45° C.

Inasmuch as the unit containing the mixer valve and circulation pump is located in the immediate vicinity of the boiler, there is practically no energy loss caused by mixing the heating water and the return flow. On the contrary, the lifetime of connectors and of the boiler proper will be significantly increased due to the reduction of temperature variations.

The position of the actuator blades 11 which is shown in FIGS. 1 and 2 is the preferred idle position, since this position permits perfect circulation of heated water through the heating circuit.

The circulation pump 8 could malfunction at a time when the actuator is turned 90°, e.g. because the addition of heat to radiators 5 from boiler 1 is to be discontinued. In that position of blades 11, the heating circuit proper (including radiators 5) and the circulation from the boiler 1 are blocked by blades 11 and the heating circuit no longer is provided with hot water from the boiler.

In order to prevent being stuck in this blocked condition, an idle position of the actuator, preferably manually controllable, has been provided. The idle position corresponds to the position illustrated in FIG. 2. In this position, the heater remains functional even without pump, due to thermal currents and gravity, although possibly with lesser circulation speed of the hot water. The water coming from the boiler 1 rises due to its higher temperature in the heating circuit, and, after yielding its heat, it flows back to the boiler via gravity, along lines 6 and 3.

In order to facilitate such setting the actuator to the idle position, a coupling that can be manually released has been assigned to the actuator, by means of which coupling the actuator can be brought manually into its idle position.

Such a coupling can be built in varying manners, In the simplest way, the shaft 12 is extended somewhat out of the mixer valve on one side and is provided there with a manually accessible coupling part which can be activated by means of a rod, or a lever, extending from the housing. The rod or lever allows manual turning of the blades. In another possible execution in which shaft parts are rotationally coupled when needed, the shaft 12 is extended into the range of a half-round shaft which can be turned from the outside. Shaft 12 is provided with a recess resembling the half-round shaft. Therefore, if the shaft 12 is turned, either the free end of the shaft would turn over the flattened end of the half-round shaft, or the half-round shaft portion proper engages and is turned in the recess, whereby a turning of the rod could directly turn the shaft of the actuator blades.

This compact execution according to the invention can be used without design changes for a wide performance range from e.g. 12 KW to 110 KW.

The invention was explained on the basis of concrete design suggestions. For the expert active within the field, a number of modifications will now appear possible, which can be included within the framework of the invention. It is important that in each position of the actuator of the mixer valve, a certain return flow of hot water into the return circuit is guaranteed. The expert is free to select the necessary piping design between pump and mixer valve inside the housing or with bypass lines at the housing.

With the arrangement according to the invention it is possible, for the first time, to place the circulation pump proper in the heating return flow, which, as already explained, makes circulation of hot water possible even if the pump itself malfunctions, since in such a case, the rise of the hot water is in no manner obstructed, and the return water can flow through the pump by gravity.

I claim:
1. In a mixer valve suitable for a heating installation having a hot water inlet, a heater line outlet, a heating return inlet, and a boiler return line outlet communicating with the interior of the mixer valve and a mixer actuator provided with blades disposed within the interior of said mixer valve for directing water flow within the interior of said valve from the hot water inlet to the heater line outlet and heating return line inlet to the boiler return line outlet, said valve integrated within the housing of a circulating pump and controllably coupled to a running wheel drive within the circulation pump for effecting movement of the blades and thereby directing flow of hot water therefrom and return of heating water thereto, the improvement which comprises:

an actuator having blades of a reduced width relative to a space defined therefor within said interior, thereby creating a space between the ends of the blades and the interior such that about 10 percent of any hot water supplied through said hot water inlet will mix with any water returned through said heating return line inlet regardless of a position of the actuator, whereby the heating water returning along the boiler line is reliably heated prior to returning to the heating installation.

2. The mixer valve according to claim 1 further comprising a manual adjustment means for positioning the blades within said housing, whereby an idle position can be selected manually.

3. The mixer valve according to claim 2 wherein the actuator and the running wheel drive are controllably coupled by means of a mechanical coupling, the actuator being wheel shaped, whereby the valve is adjustable by means of a rotating movement.

4. The mixer valve accordiing to claim 2 wherein the actuator is a wheel-shaped rotatable structure and the manual adjustment means comprises a half-shaft having a flattened portion thereon, in communication with the actuator such that on rotating of the actuator, the half-shaft turns the actuator blades.

5. The mixer valve according to claim 2, wherein said inlets are co-linear and perpendicular to said outlets, and further comprising means to orient the blades at an idle position at substantially 45° between said inlets and said outlets.

6. The mixer valve according to claim 8, wherein an access channel for feeding the return flow through the valve describes a downward angle of about 45°.

7. The mixer valve according to claim 8, wherein the inlets and the outlets are arranged such that cooler returning water flows downwardly and said space defines a guideway through which the water bypasses the valve in gravity flow operation of the heating installation.

* * * * *